United States Patent Office 3,315,299
Patented Apr. 25, 1967

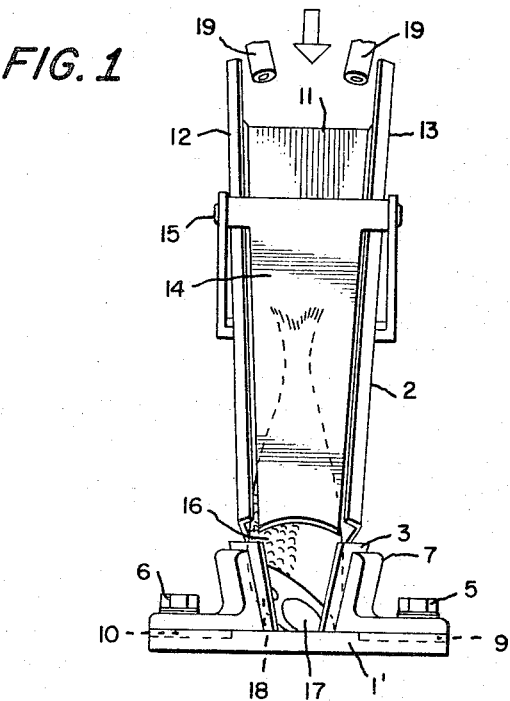
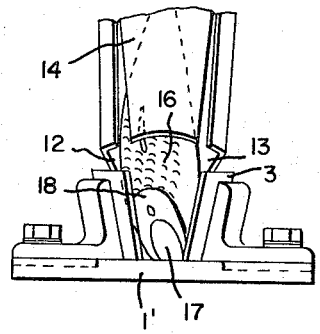
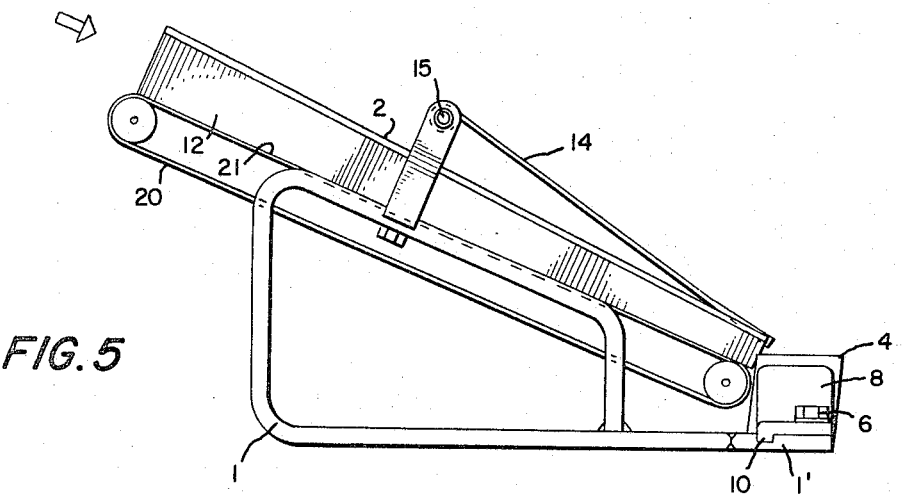

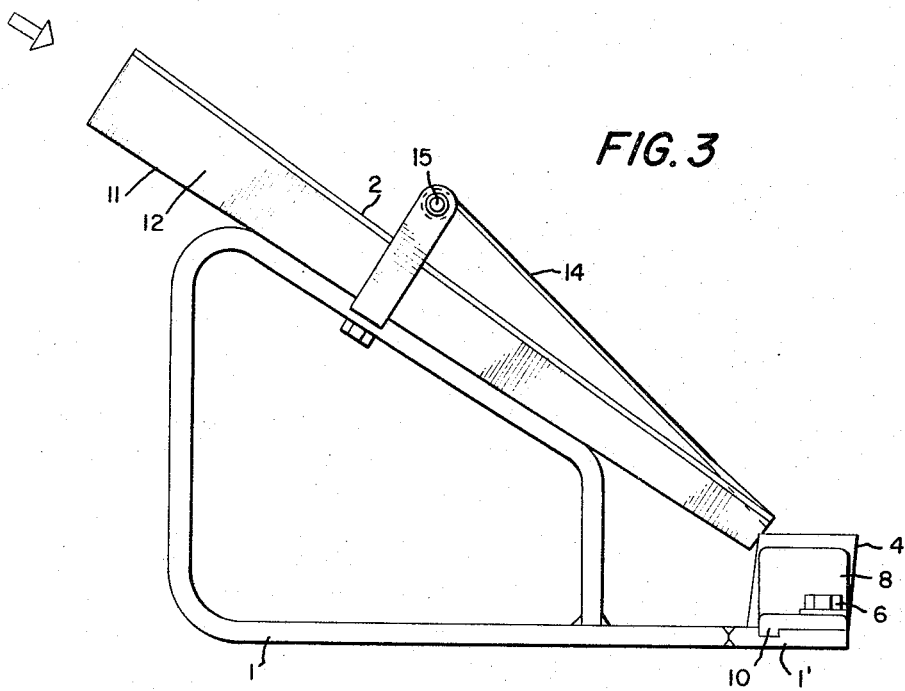
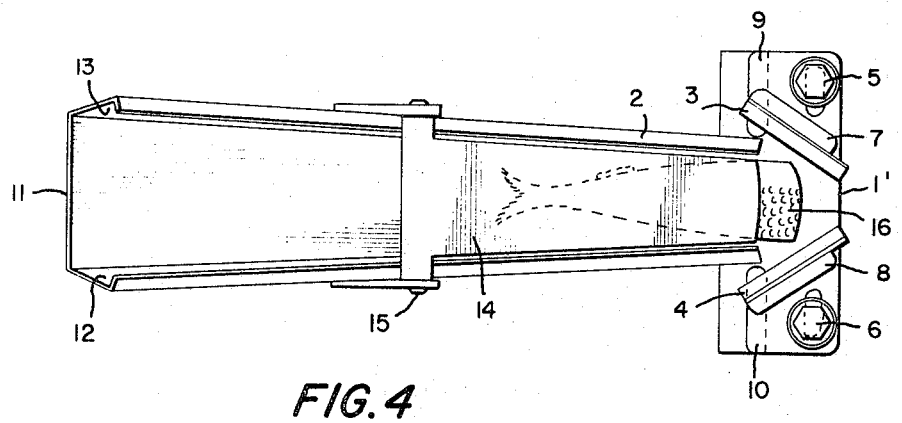

3,315,299
ARRANGEMENT WITH FISH HANDLING MACHINES, DESIGNED TO SORT THE FISH INTO A DEFINITE ORIENTATION
Paul Danielsson, Vallingby, Sweden, assignor to Arenco Aktiebolag, Vallingby, Sweden
Filed Mar. 1, 1965, Ser. No. 436,206
Claims priority, application Sweden, Mar. 17, 1964, 3,317/64
6 Claims. (Cl. 17—2)

The present invention relates to an arrangement with fish handling machines, such as cleaning and filleting machines, into which the untreated fish are fed by means of an automatic or semi-automatic conveyor. The invention particularly relates to a chute designed to sort the fish, which pass head-first along the same, into such a position that they leave the chute with their bellies pointing in a certain direction.

The significance of satisfactorily feeding the untreated fish into the cleaning machine should be obvious. The complete cleaning procedure and its result depends on whether the fish are turned correctly when fed into the machine. Incorrect feeding means that a portion of the fish must be rejected; this involves financial losses.

When treating fish mechanically, the fish must enter the machine with their bellies turned in one and the same direction, as already one percent wrongly turned fish is most unsatisfactory from an economical point of view.

Arrangements designed to solve this problem of wrongly turned fish are previously known. The U.S. Patent 2,938,229 teaches i.a. a construction with step-wise tapered channels in which the bodies of the fish are carried longitudinally and turned 90° about their longitudinal axis. A feeler is arranged in order to control the position of turned fish, allowing fishes that are correctly positioned to pass but preventing fish wrongly positioned from proceeding further.

This arrangement, however, operates much too slowly for practical use and appears to be all too complicated since turning is carried out in one stage and control in another. Furthermore, the principle of tapered channels for turning the fish does not function particularly well in the case where the belly of the fish is swollen with roe or milk.

The geometry of the body of fish must be studied in order to solve the problem of turning fish from an arbitrary position to a definite position. Most fish, such as those of the herring family, normally have a broad back but a narrow belly, which means that when the fish lies on a support the center line along its back lies at a higher level than the corresponding line along its belly. Such a fish, when fed into the tapered channels for turning, already occupies such a position that its back turns upwards during passage through the smallest section of the channel, irrespective of which side of the fish was originally turned upwards. Fish with broad backs and narrow bellies are thus not too difficult to turn into the correct position. The backs and the bellies of fish full of roe or milk are, however, approximately the same width. The centre line along the back does not therefore come to lie at a higher level than the centre line of the belly, as was the case above. When such a fish passes through a tapered channel, it is possible that an incorrect turning may occur so that the belly is turned upwards. The fish may also jam in the channel.

Correct turning of the fish is however, by means of the present invention, achieved quickly, simply and with remarkable sureness, by utilizing the fact that the belly portion of the fish, even if full of roe or milk, has another consistency than the neck and back sections.

Since the chute according to the invention is to be used preferably for fish that have been beheaded, the description of the purpose of the invention is restricted to a corresponding extent, although even whole fish can be correctly turned successfully by the arrangement.

It is evident from the above short statement of the invention that fish are fed into the input end of a sloping chute, or a chute supplied with transport members, for example a web transporter in the bottom of the chute, and accelerated along the chute.

Correct turning of the fish is achieved by altering the direction of movement of the fish at the end of the chute and the guide plates situated thereabove the support. The fish passing headfirst along the chute are squeezed on collision with this support so that the soft belly portion is flattened and deformed at its foremost part, whereby the center line of the belly in this section, at the same instance as the collision occurs, comes closer to the support. At approximately the same time the forward end of the back of the fish strikes against said guide plates, a little above the support. The fish, upon its continued movement out through the exit, is twisted from its earlier side position to a position where its belly points downwards. Fish containing roe or milk are also turned to a correct position in this way. Lifting of the back during the twisting movement is facilitated by arranging the guide plates so that they slope outwards. Simultaneous lifting of the belly is prevented by the fact that the fish is forced towards the support, due to the sudden change in direction. It is also advisable that the bottom of the chute ends somewhat before reaching the support and guide plates, e.g. with small fish ⅓ of a fish length, whereby turning of the front section of the fish is made easier since the influence of roe or milk in the belly is thereby reduced.

The invention is described below in connection with the attached drawing in which FIG. 1 shows a vertical projection of the chute according to the invention, FIG. 2 shows a further vertical projection of the same chute, FIG. 3 shows a side projection and FIG. 4 a horizontal projection of the arrangement according to the invention.

FIGURE 5 is a side projection of a modification of the embodiment as shown in FIGURE 3.

In the arrangement according to the present invention means 1′, 3 and 4 are provided to squeeze the soft belly portions 17 of fish passing through a chute 2 and simultaneously to support their backs 18, thereby turning fish, when they leave the arrangement, so that their bellies point downwards.

A special embodiment of the invention comprises besides a chute 2 having sides 12, 13, a bottom 11, an upper input end and a lower output end for feeding fish headfirst from the input end to the output end, a fish deflecting plate 1′ located at the output end and forming an extension of the chute bottom 11. The fish deflecting plate defects upwardly from the bottom and is provided with two upstanding guide plates 3 and 4 arranged edgewise on the fish deflecting plate and converging from the output end, thereby forming a tapering exit of the chute.

As can be seen from FIG. 1, the arrangement is built upon a support 1, designed so that it firmly supports the inclined chute 2. The guide plates 3 and 4 form a converging path on a fish deflecting plate 1′ and are fastened by means of screws 5 and 6 lying in oblong holes in securing plates 7 and 8, which are displaceable laterally at right angles to the chute due to guides 9 and 10, by which means a mutual distance between the guide plates can be adjusted. The position of the guide plates can be locked by the screws 5 and 6. Furthermore, the guide plates are mounted at an angle to the deflecting plate so that the distance between them is narrower at the support than at their upper edges. The chute 2 is designed with a flat bottom 11 and outwardly inclined sides 12 and 13, the upper edges of which are bent inwards. The chute is also provided with a cover-plate, in the form of a bar 14, mounted on a shaft 15 arranged across the chute; the lower end of the bar, which is curved, is capable of being moved upwards. The object of the bar is to centre the fish, so that they lie in the middle of the chute.

The fish is transported by chute 2 up to the arrow shown in FIG. 1, it then, due to gravity, passes along the chute and arrives at the position shown in FIG. 1 whereby the front section of its belly 17 collides against the deflecting plate 1 and is deformed, the front section of its back collides against the guide plate 4 which guides the fish out through the exit of the chute between the two guide plates 3 and 4. These form, as can be seen from FIG. 1 the tapered exit and are so positioned that the fish is forced to turn through an angle of 90° in order to pass through, i.e. the narrowest section of the exit is narrower than the depth of the fish and somewhat wider than its thickness; adjustment of the distance between the plates is not critical, fish of different sizes appearing in a batch can be passed through the chute with good results, with only one setting. The continued guiding of the fish through the exit is shown in FIG. 2. An indication of the turning direction (FIG. 1) is already given when the front section of the fish belly 17 collides against the deflecting plate 1 and the front section of the back 18 against the guide plate 4. As was previously mentioned, the centre line along the back of the fish then lies above the corresponding line along the belly, and logically this line will follow the deflecting plate during the passage of the fish out through the exit, whilst the back of the fish is supported by the guide plate and at the same time slides out on this through the exit. Thus turning is carried out in that direction which causes the back of the fish to face upwards. In the case where the fish slides down the chute on its other side the back of the fish will collide against guide plate 3 instead. The operation becomes thereby essentially the same as that described above with the exception that the turning direction is reversed. Irrespective of which side of the fish is turned downwards when it is carried by the chute, and irrespective of whether they first collide, due to the size, with the guide plate or the deflecting plate, they are turned at the exit of the chute so that its back points upwards and belly downwards.

It may be convenient to utilize additional arrangements in order to further raise the efficiency of the invention. By allowing a stream of water to flow from nozzles 19 (FIG. 1) down along the chute the speed of the fish in the chute can be increased, reducing the risk of the fish piling up due to a jammed fish. As it has been proved more advantageous to turn the fish immediately prior to entering the handling machine, which requires the fish to be in certain orientation, the object of the invention has been developed with the intention that entry of the fish into the handling machine will occur directly from the outlet of the chute. Turning of the fish, so that their bellies face the same direction, will consequently be carried out after their heads have been cut off, which in itself can take place without such orientation, but prior to the cleansing of the belly. The ability of the invention to turn fish that have also been beheaded, its small dimensions and the possibility of designing it without moving parts means that the chute according to the invention can be given an advantageous position in a fish handling process between the station for beheading and that for cleansing the fish. One condition for such a positioning of the turning arrangement is obviously that turning can be carried out at the same high feeding speed at which the connected machines operate; this is the case with the chute according to the invention which in trials, together with a complete fish handling machine, showed itself to operate faultlessly with a capacity of approximately 350 fish per minute.

In the embodiment shown in the drawing, the guide plates are adjustable, with respect to the mutual distance between them. It is considered easy to arrange that these plates can be adjusted in the longitudinal direction of the chute and furthermore concerning their height and mutual angle. Subsequent adjustments to the initial setting are normally not necessary for most of the existing types of fish.

The invention is obviously not limited to the shown described embodiment; separate modifications are possible within the scope of the attached claims.

Thus the bottom of the chute may be movable in the direction of the feed, as indicated in FIG. 5 where the position of a movable endless belt 20 is shown having a top surface 21 constituting the bottom of the chute. The slope of the chute can be hereby decreased and the chute may even be horizontal. It is essential however that the angle between the bottom 11 of the chute and the deflecting plate 1, between the guide plates 3 and 4, is maintained and that the chute carries the fish at the speed required to squeeze the belly portion of the same.

What is claimed is:

1. A fish handling machine comprising a downwardly sloping chute having sides, a bottom, an upper input end and a lower output end for feeding fish headfirst from said input end to said output end, a fish deflecting plate located at said output end forming an extension of said chute bottom, said fish deflecting plate being deflected outwardly from said bottom and provided with two upstanding guide plates arranged edgewise on said fish deflecting plate and converging from said output end, thereby forming a tapering exit of said chute.

2. A fish handling machine comprising a chute having sides, a conveying belt having a top surface forming the bottom of said chute, said chute having an input end and an output end, driving means for said belt for feeding fish fed headfirst into said input end to said output end, a fish deflecting plate located at said output end forming an extension of said bottom, said fish deflecting plate being deflected upwardly from said bottom and provided with two upstanding guide plates arranged edgewise on said fish deflecting plate and converging from said output end, thereby forming a tapering exit of said chute.

3. A machine as claimed in claim 1, wherein said upstanding guide plates diverge upwardly from said fish deflecting plate.

4. A machine as claimed in claim 1, wherein said bottom ends a small distance before reaching said fish deflecting plate.

5. A machine as claimed in claim 1, wherein a guide bar comprising a curved plate is rotatably mounted above said chute covering at least a section of said chute at said output end.

6. A machine as claimed in claim 1, wherein water nozzles are connected to a water pipe at said input end.

References Cited by the Examiner

UNITED STATES PATENTS

| | | | |
|---|---|---|---|
| 1,430,011 | 9/1922 | Heath | 17—2 |
| 1,689,919 | 10/1928 | Heath | 17—2 |
| 1,893,903 | 1/1933 | Mullins | 17—2 |
| 2,008,820 | 7/1935 | Doxsee et al. | 17—2 |
| 2,644,980 | 7/1953 | McKinstry | 17—2 |
| 2,672,647 | 3/1954 | Haber | 17—2 |
| 3,229,326 | 1/1966 | Eriksen | 17—2 |
| 3,237,750 | 3/1966 | Eriksen | 17—2 X |

LUCIE H. LAUDENSLAGER, *Primary Examiner.*

SAMUEL KOREN, *Examiner.*